United States Patent [19]

Stolzer

[11] Patent Number: 4,969,791
[45] Date of Patent: Nov. 13, 1990

[54] APPARATUS FOR INSERTING AND REMOVING WORKPIECES IN A STORAGE SHELF ARRANGEMENT

[75] Inventor: Paul Stolzer, Achern, Fed. Rep. of Germany

[73] Assignee: STOPA Stahlbau GmbH & Co., Achern-Gamshurst, Fed. Rep. of Germany

[21] Appl. No.: 392,792

[22] Filed: Aug. 11, 1989

[30] Foreign Application Priority Data

Oct. 10, 1988 [DE] Fed. Rep. of Germany ....... 3834397

[51] Int. Cl.$^5$ .............................................. B65G 1/06
[52] U.S. Cl. ................................... 414/281; 414/282; 414/283; 414/752; 414/626; 414/627; 187/9 R
[58] Field of Search ............... 414/281, 282, 283, 273, 414/274, 277, 278, 279, 280, 618, 619, 626, 627, 752, 225, 222, 225, 226, 793, 797, 331; 187/9 R; 901/40

[56] References Cited

U.S. PATENT DOCUMENTS

| | | | |
|---|---|---|---|
| 3,750,804 | 8/1973 | Lemelson | 414/280 X |
| 3,782,564 | 1/1974 | Burt | 414/281 |
| 3,840,131 | 10/1974 | Castaldi | . |
| 4,364,706 | 12/1982 | Kranzlmütter | 414/283 X |
| 4,735,539 | 4/1988 | Hakkinen et al. | 414/281 |

FOREIGN PATENT DOCUMENTS

| | | | |
|---|---|---|---|
| 2336336 | 1/1974 | Fed. Rep. of Germany | 414/281 |
| 8501493 | 4/1985 | PCT Int'l. Appl. | . |
| 678005 | 8/1979 | U.S.S.R. | 414/282 |

*Primary Examiner*—Frank E. Werner
*Attorney, Agent, or Firm*—Edwin E. Greigg

[57] ABSTRACT

The apparatus has a frame formed with vertical and horizontal supports to which are assembled a plurality of parallel spaced shelves. A horizontal load girder is vertically movable along vertical supports with load pickup oriented toward the shelf arrangement. The frame is movable toward and away from a storage shelf arrangement while the load pickup maintaining its vertical position; to this end, the frame has deflection wheels, substantially at its upper and lower corners, for a tensioning arrangement extended in a FIG. 8 in the vertical direction; with their upper and lower ends, the tension means are attached in stationary fashion, likewise in a FIG. 8, either to the shelf arrangement or to a point corresponding to the maximum distance of the frame from the shelf arrangement.

6 Claims, 1 Drawing Sheet

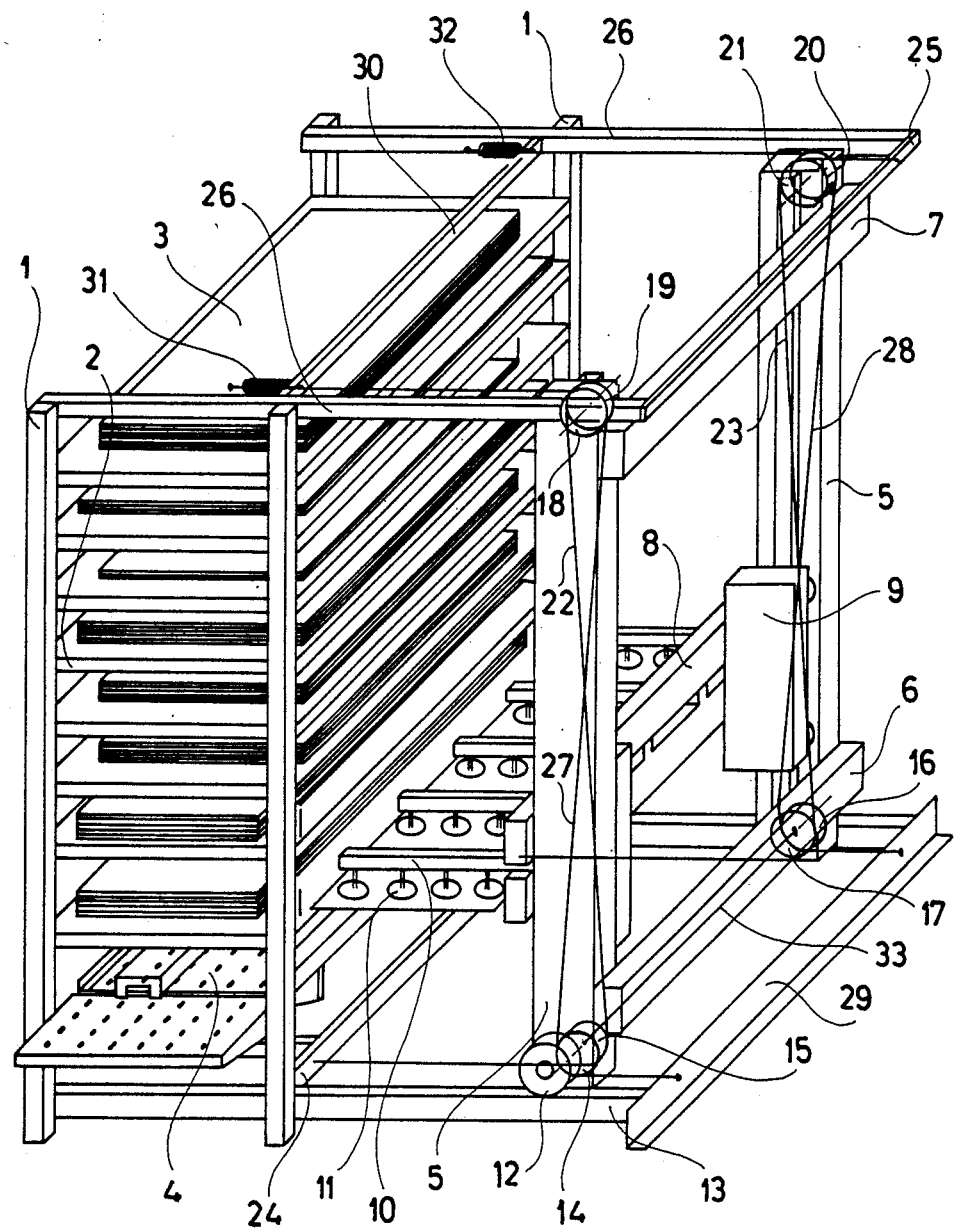

APPARATUS FOR INSERTING AND REMOVING WORKPIECES IN A STORAGE SHELF ARRANGEMENT

BACKGROUND OF THE INVENTION

The invention relates to an apparatus for the insertion and removal of workpieces in shelves, placed in alignment one above the other, of a storage shelf arrangement in which a frame parallel to and spaced apart from one side of the cabinet is formed from two vertical posts and beams joining the posts at the top and/or bottom, and in which a horizontal load girder that is vertically movable on the posts carries load pickup means, oriented in the direction toward the shelf arrangement, for picking up the workpieces.

In known apparatuses of this kind, the frame is stationary, or at least is immovable in terms of its distance from the shelf arrangement, while the load pickup means carried by the load girder are movable horizontally outward or are adjustable in length, so that with or without a workpiece they can move into the shelf arrangement or be retracted back into the corridor that is formed by the distance of the frame from the shelf arrangement. This kind of construction, with load pickup means of adjustable length, for instance in the form of telescoping forks, involves considerable weight, requires a great deal of space and is complicated, so that the result is a considerable capital investment.

Another unfavorable factor is that in the extended position, that is, when they are picking up a workpiece from a shelf, for instance, the load pickup means form a lever arm of considerable length; this means that not only the load pickup means but also the construction supporting it must be designed with increased strength.

OBJECT AND SUMMARY OF THE INVENTION

It is an object of the invention to embody an apparatus of the above type in such a way that not only are the above-described disadvantages avoided, but a complicated embodiment of the load pickup means, in particular, such that they are adjustable in length, is no longer necessary; the overall result is that the construction, including the frame, is lighter in weight, simpler, and thus less expensive and easier to service.

According to the invention, this object is attained in that the frame, while maintaining its vertical position, is movable toward and away from the shelf arrangement via wheels secured rotatably on the frame along paths of motion extending parallel to one another and horizontally away from the shelf arrangement at right angles thereto. In the region of the upper and lower ends of the two posts, the frame has one pair each of rotatably secured deflection wheels; that each of the upper deflection wheels and each of the lower deflection wheels respectively are rotatable about a common axis. One first wheel of each pair of deflection wheels is embodied as a gear wheel, wherein the gear wheels are identical to one another and gear wheels located above one another are in alignment with one another in the vertical direction and engage a gear wheel chain which wraps around the upper gear wheels substantially on the side toward the shelf arrangement and around the lower gear wheels substantially on the side remote from the shelf arrangement. The gear chain extending horizontally to an end at its lower end is fastened to the shelf arrangement and extending horizontally to an end at its upper end is fastened in stationary fashion to a first part located at a maximum distance of the frame from the shelf arrangement on the side of the frame remote from the shelf arrangement. The second deflection wheels are identical to one another and those located above one another are in vertical alignment with one another and engage a tension means which wraps around the upper deflection wheels substantially on the side remote from the shelf arrangement and around the lower deflection wheels substantially on the side oriented toward the shelf arrangement and tension means extending to an end horizontally at its upper end is fastened to the shelf arrangement and extending to an end horizontally at its lower end is fastened in stationary fashion to a second part located at a maximum distance of the frame from the shelf arrangement on the side of the frame remote from the shelf arrangement; and the upper and/or lower gear wheels are torsionally connected to a common shaft.

These provisions according to the invention assure that the load pickup means can be embodied in a simple manner, not being adjustable in length, since their entry into the shelves and their retraction from the shelves is assured by the mobility of the frame with respect to the shelf arrangement.

This mobility of the frame is assured in turn by means of an extremely simple construction, achieved with structural components readily available on the market; this construction makes no rigid technical demands, especially in terms of control technology, yet nevertheless it functions completely reliably and accurately. In particular, the parallelism between the frame and the side oriented toward it of the shelf arrangement is assured, and the frame has no chance of tilting out of the vertical position originally assigned to it, because it is guided in compulsory fashion in the region of both its upper and lower corners.

Nevertheless, because of the characteristics according to the invention an extremely lightweight design for the entire shelf access apparatus is attained, and the external guide means for the frame are also very simple, because they are attainable merely with standard runner tracks for the wheels, embodied by profiled rails laid along the floor.

As for the tension means provided in addition to the gear chains, it has proved to be suitable for them to be embodied as cables and to associate them with cable pulleys as the second deflection wheels.

It is also advantagous that the tension means are fastened to the shelf arrangement or to the second part via an interposed tension spring, to assure sufficient initial tension of the tension means in a simple manner.

Both the gear chains and the tension means or cables have a considerable length in their vertical portion between the upper and lower deflection wheels that is not guided over the deflection wheels in the course of movement of the frame and that consequently does not need to be embodied flexibly. This portion can advantageously be embodied in the form of a rod, making the construction still simpler and less expensive.

As for the movements of the frame, they may be initiated, for instance from a drive motor mounted on the frame, into a shaft that joins either the upper or the lower gear wheels to one another in a manner fixed against relative rotation. The possibility also exists, however, of moving the frame by means of hydraulically actuated thrust or tension means engaging the base of the frame.

The invention will be better understood and further objects and advantages thereof will become more apparent from the ensuing detailed description of a preferred embodiment taken in conjunction with the drawing.

BRIEF DESCRIPTION OF THE DRAWING

The drawing illustrates a perspective view of the assembly.

DESCRIPTION OF THE PREFERRED EMBODIMENT

The drawing shows a storage shelf arrangement, embodied by four corner posts 1, with shelves 2 on which workpieces, in the present instance packets of sheet-metal plates 3, are stored.

A lower shelf of the storage shelf arrangement is embodied as a ball caster table 4, on which individual metal plates, taken from the storage shelves 2, are to be placed and then aligned and positioned for further processing by tilting of the ball caster table 4 in various possible ways, not shown in further detail here.

A shelf access apparatus is used to remove and insert the individual metal plates from the shelves 2 onto the ball caster table 4. This apparatus substantially comprises a frame embodied by vertical posts 5 and parallel cross-beams 6, 7 joining the posts at their top and bottom; on the posts 5, a load girder 8 is vertically movable, in a well-known manner and hence not described in detail here, by carriages 9 located on the ends. On its side toward the shelf arrangement 1, 2, the load girder 8 has load pickup means 10 extending toward the shelf arrangement, which in the present case are embodied as horizontal parallel spaced arms that via suction cups 11 disposed on their underside are able to pick up individual metal sheets from the shelves 2.

For the extension and retraction of the load pickup means 10 relative to the shelves 2, the frame 5, 6, 7 is movable horizontally with respect to the side of the shelf arrangement facing it, while maintaining its vertical position; to this end, it rolls with wheels 12, rotatably secured to the outside of the posts 5, on paths embodied by rails 13 extending horizontally and perpendicularly to the shelf arrangement.

To maintain the vertical position of the frame and its parallelism relative to the side of the shelf arrangement facing it during the movements of the frame, respective pairs of deflection wheels 14–21 are rotatably fixed to the frame, in this case to the posts 5, with one pair each in the vicinity of the upper and lower ends of the posts. A first wheel of each pair of deflection wheels is embodied as a gear wheel 14, 16, 18, 20, while the second deflection wheels have the form of cable pulleys 15, 17, 19, 21.

The wheels 14, 16 on the one hand and 18, 20 on the other are disposed vertically one above the other and in alignment with one another, and are embodied as cable pulleys identical to one another, while the wheels 15, 17 on the one hand and 19, 21 on the other are likewise embodied vertically above one another and in alignment, but in the form of gear wheels that are not identical to one another.

Gear chains 22, 23 are guided via the gear wheels 14, 17, 19, 21 in such a manner that they wrap around the wheels 15, 17 substantially on the side remote from the shelf arrangement and around the wheels 19, 21 substantially on the side toward the shelf arrangement. On the ends, the gear chains 22, 23, come to an end horizontally at the bottom and are fastened to a spar 24 of the shelf arrangement 1. Where they come to an end horizontally at the top they are fastened to a first frame part 25, which by means of parallel struts 26 joined to the shelf arrangement 1 are held stationary, parallel to the shelf arrangement 1 and at a distance from the shelf arrangement 1 that is equivalent to the maximum distance of the frame 5, 6, 7 from the shelf arrangement 1.

Cables 27, 28 are guided via the cable pulleys 14, 18 on the one hand and 16, 20 on the other in such a way that they wrap around the rollers 14, 16 substantially on the side toward the shelf arrangement and around the rollers 18, 20 substantially on the side remote from the shelf arrangement. The cables 27, 28 are fastened in stationary fashion, coming to an end horizontally at the lower end, to a second frame part 29, which is secured substantially parallel to and below the first part 25, in the present instance connected to the rails 13, while the upper ends of the cables come to an end horizontally and are secured to a spar 30 of the storage shelf arrangement 1.

This last-mentioned fastening is effected with the interposition of springs 31, 32 that keep the cables 27, 28 in a state of initial tension. Such prestressing is not necessary for the gear chains 22, 23, because they are kept prestressed by the tilting moment exerted upon the frame 5, 6, 7 by the load girder 8, the load pickup means 10 and the load suspended from them.

In the example shown in the drawing, the lower gear wheels 15, 17 are joined to a shaft 33 in a manner fixed against relative rotation. This assures that in the travel of the frame 5, 6, 7, because the various gear wheels 15, 17, 19, 21 are embodied identically to one another, the upper and lower corners of the frame always execute motion of the same magnitude, so that the frame always remains in its vertical position, parallel to the side of the shelf arrangement facing it. The cables 27, 28 guided over the cable pulleys 14, 16, 18, 20 function in the same manner in the event that the frame should tend to pivot clockwise as seen in the drawing, which may for instance happen as a consequence of acceleration forces arising in the frame travel.

The initiation of the travel for the frame 5, 6, 7 may be done by means of a rotational drive, not shown, for the shaft 33; naturally in the same way such a shaft may also provided as a torsional connection for the upper gear wheels 19, 21 and may be acted up by a traveling mechanism.

However, the option also exists of moving the frame 5, 6, 7 translationally by means of hydraulic cylinder/piston assemblies engaging it.

The cables 22, 23 and the gear chains 27, 28 have a portion, in their substantially vertical region between the upper and lower deflection wheels, that in the travel of the frame 5, 6, 7 does not run over the deflection wheels and consequently need not be embodied flexibly. For these portions, it may be practical to embody them as rods, to simplify the construction and make it less expensive.

Further embodiments of the apparatus described are possible by providing, in place of the cable pulleys 14, 16, 18, 20, gear wheels that are likewise identical to one another, and for which the means wrapping around them is once again a gear chain. If these gear wheels are identical to the gear wheels 15, 17, 19, 21, then the respective gear wheel pairs 14, 15; 16, 17 and so forth may also be connected to one another in a manner fixed against relative rotation.

Such a design is particularly suitable in cases in which there is a further shelf arrangement disposed on the side opposite the shelf arrangement 1 shown here, and the load girder 8 is provided with load pickup means 10 on both sides.

Furthermore, in all cases, on the condition that the shaft 33 is disposed between the sprocket wheels 19, 21, the beam 6 may be omitted, so that the frame is embodied in the manner of a portal crane, which makes underfloor mounting possible. In that case, it is practical to provide the wheels 12 with a lateral guide as well with respect to the rails 13.

The construction described above, in an extremely simple manner, offers a frame 5, 6, 7 that is movable accurately relative to the storage shelf arrangement and serves as a guide and motion bearer for a load girder 8 and load pickup means 10 secured to it; the load pickup means 10 no longer need to perform any positioning functions, and as a result can be embodied extremely simply.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the U.S. is:

1. An apparatus for inserting workpieces onto and removing them from shelves located in alignment one above the other in a storage self arrangement, the apparatus comprises a frame parallel to and spaced apart from one side of the shelves, the frame being formed from two vertical posts and crossbeams joining the posts at their top and bottom ends and in which a horizontal load girder is secured to said frame for vertical movement on the posts, said horizontal load girder includes a load pickup means, oriented in a direction toward the shelf arrangement, for carrying the workpieces, said frame (5, 6, 7), while maintaining its vertical position, is movable toward and away from the shelf arrangement via wheels (12, 13) secured rotatably on the frame along paths of motion (13) parallel to one another and movable horizontally relative to the shelf arrangement at right angles thereto; that in the region of the upper and lower ends of the two posts (5, 6), the frame has one pair each of rotatably secured first and second deflection wheels (14, 15; 16, 17; 18, 19; 20, 21); that the upper deflection wheels and the lower deflection wheels, respectively, are rotatable about a common axis; that one first wheel (15, 17, 19, 21) of each pair of deflection wheels is formed as a gear wheel, wherein the gear wheels are identical to one another and the gear wheels located above one another are in alignment with one another in a vertical direction and engage a gear wheel chain (22, 23) which wraps around the upper gear wheels (19, 21) substantially on a side toward the shelf arrangement and around the lower gear wheels (15, 17) substantially on a side remote from the shelf arrangement, and the gear chain extends horizontally so that its lower end is fastened to the shelf arrangement and extends horizontally and vertically so that its upper end is fastened in stationary fashion to a first frame part (25) located at a maximum distance of the frame from the shelf arrangement on a side of the frame remote from the shelf arrangement; that the second deflection wheels (14, 16, 18, 20) are identical to one another and are located above one another in vertical alignment with one another engage and a tension means (27, 28), said tension means being wrapped around the upper deflection wheels (18, 20) substantially on the side remote from the shelf arrangement and around the lower deflection wheels (14, 16) substantially on a side oriented toward the shelf arrangement and which tension means extends horizontally at its upper end which is fastened to the shelf arrangement and extends horizontally at its lower end with its lower end fastened in stationary fashion to a second frame part (29) located at a maximum distance of the frame from the shelf arrangement on the side of the frame remote from the shelf arrangement; and that the upper gear wheels (19, 21) and/or lower gear wheels (15, 17) are torsionally connected to a common shaft (33).

2. An apparatus as defined by claim 1, in which wheels (12) are disposed on lower corners of the frame (5, 6, 7), and paths of motion of said frame (5, 6, 7) is along runner rails (13) on the wheels (12).

3. An apparatus as defined by claim 1, in which said tension means (27, 28) are formed as cables, and the second deflection wheels (14, 16, 18, 20) are formed as cable pulleys.

4. An apparatus as defined by claim 1, in which the tension means (27, 28) are attached to the shelf arrangement or to the second frame part (29) via an interposed tension spring (31, 32).

5. An apparatus as defined by claim 1, in which a portion of the chains (22, 23) and of the tension means (27, 28) that extends substantially vertically in a nondeflected manner via the gear wheels (15, 17, 19, 21) and the deflection wheels (14, 16, 18, 20) is embodied as a rod.

6. An apparatus as defined by claim 1, in which the tension means (27, 28) are formed as gear wheel chains and the second deflection wheels (14, 16, 18, 20) are formed as sprocket wheels.

* * * * *